United States Patent [19]
Yoshida et al.

[11] Patent Number: 5,100,733
[45] Date of Patent: Mar. 31, 1992

[54] COMBINATION OF A RUBBER MEMBER AND AN ALUMINUM ALLOY MEMBER

[75] Inventors: Hiroshi Yoshida; Teruo Akema; Toshihiko Suenaga; Toshiya Nishino; Eiji Suzuki; Hidenori Kanno, all of Utsunomiya, Japan

[73] Assignee: Honda Giken Kogyo Kabushiki Kaisha, Tokyo, Japan

[21] Appl. No.: 683,529

[22] Filed: Apr. 9, 1991

Related U.S. Application Data

[63] Continuation of Ser. No. 351,005, May 12, 1989, abandoned.

[30] Foreign Application Priority Data

May 17, 1988 [JP] Japan .................. 63-120055

[51] Int. Cl.$^5$ ..................... B32B 15/06; B32B 25/04
[52] U.S. Cl. ..................... 428/462; 428/472.2; 428/492
[58] Field of Search ............... 428/462, 408, 354, 328, 428/457, 465, 435, 472.2, 492; 524/435

[56] References Cited

U.S. PATENT DOCUMENTS

| | | | |
|---|---|---|---|
| 3,755,066 | 8/1973 | Rose | 428/462 X |
| 4,014,730 | 3/1977 | Selover, Jr. et al. | 428/408 X |
| 4,258,100 | 3/1981 | Fujitani et al. | 428/354 X |
| 4,690,778 | 9/1987 | Narumiya et al. | 524/435 X |
| 4,690,778 | 9/1987 | Marumiya et al. | 524/435 X |
| 4,709,781 | 12/1987 | Scherzer | 428/465 X |
| 4,731,282 | 3/1988 | Tsukagoshi et al. | 428/328 X |

FOREIGN PATENT DOCUMENTS

61-160489 7/1986 Japan .
63-301276 12/1988 Japan .

Primary Examiner—Thomas J. Herbert, Jr.
Attorney, Agent, or Firm—Armstrong, Nikaido, Marmelstein, Kubovcik & Murray

[57] ABSTRACT

If a member made of rubber containing carbon black and a member made of aluminium alloy come into contact with each other under existence of an electrolytic solution, corrosion of the aluminium alloy member would proceed. Such corrosion of the aluminium alloy member can be suppressed by selecting a surface resistivity (surface electric resistivity) of the rubber member at $10^6 \Omega$ or higher, and more preferably $10^7 \omega$ or higher.

4 Claims, 4 Drawing Sheets

COMBINATION OF A RUBBER MEMBER AND AN ALUMINUM ALLOY MEMBER

This application is a continuation of application Ser. No. 351,005 filed May 12, 1989 now abandoned.

BACKGROUND OF THE INVENTION

1. Field of the Invention

The present invention relates to a combination of a member made of rubber and a member made of aluminium alloy, in which corrosion of the aluminium alloy member that is liable to occur in contact relation to the rubber member can be reduced.

2. Description of the Prior Art

In the case where different kinds of metals, for instance, Al and Fe come into contact with each other and an electrolytic solution exists at the boundary contact surface portion, Al having a basic potential relative to Fe becomes an anode and resolves in the electrolytic solution. In order to prevent corrosion caused by contact between such different kinds of metals, the procedures such that ① making an insulator intervene between the boundary contact surfaces of the respective metals, ② preventing an electrolytic solution from entering the gap between the boundary contact surfaces, and ③ applying counter-potentials to the respective metals to eliminate a potential difference, are employed.

As this contact corrosion occurs at a contact portion between different kinds of metals, it is quite natural to consider that it cannot be generated between rubber that is deemed as an insulator and metal. For instance, while it is known that rust is liable to be produced on a body steel sheet at the location where rubber parts for motorcars such as weather strips (members for blocking gaps in a vehicle body), bonnet seals or the like are disposed, the cause of rusting was believed simply to be because at the location where rubber parts serving as seal members are disposed, water is apt to stay and hence a corrosive environment is produced.

By the way, in recent years with the aim of realization of a light weight of a vehicle body, an excellent performance and a low fuel consumption of a motorcar, examples of formation of members such as bonnets, engines and the like of aluminium alloy having a density ratio of ⅓ with respect to Fe have been increasing. What becomes an issue in the conversion into aluminium alloy of the members to be used for motorcars, is corrosion generated in a contact relationship to different metals such as Fe or the like. In the cause of investigating the problem of corrosion of aluminium alloy, the inventors of the present invention have reached the knowledge that corrosion of aluminium caused by existence of an electrolytic solution would proceed especially in a contact relationship between rubber containing carbon black and aluminium alloy (including also metallic aluminium). The present invention has been worked out under the above-mentioned technical background.

SUMMARY OF THE INVENTION

It is therefore one object of the present invention to provide a combination of a member made of rubber containing carbon black and a member made of aluminium (as used in a broad mean including also metallic alloy) in which electrolytic corrosion possible occurring at the boundary surfaces held in contact with each other can be suppressed.

According to one feature of the present inventions, there is provided a combination of a member made of rubber containing carbon black and a member made of aluminium alloy held in contact with the rubber member, in which a surface resistivity of the rubber member is $10^6 \Omega$ or higher.

The mechanism of the electrolytic corrosion of aluminium alloy at the boundary contact surface between a member made of rubber containing carbon black and a member made of aluminium alloy held in contact with each other and the operation principle of the present invention as featured above will be described hereunder.

While rubber is inherently an insulating material, normally carbon black is added thereto aiming at improvements in mechanical strength and weather resistivity, and since this carbon black serves as a conductive medium, the rubber presents conductivity. For instance, as carbon-containing ethylene propylene rubbers having excellent weather resistivity and excellent repulsive elasticity, those having a surface resistivity of $10^4$–$10^5 \Omega$ are widely employed. Corrosion of aluminium alloy occurring at a contact portion between rubber having such a relatively low surface resistivity and aluminium alloy, would be effected mainly in the mode shown in FIG. 1. In this figure, a member 1 made of aluminium alloy (hereinafter called simply "aluminium alloy member") and a member 2 made of rubber (hereinafter called simply "rubber member") held in contact with each other separate at their upper portions and an electrolytic solution 3 stays in the separated portion.

In this case, the aluminium alloy member 1 acts as a basic potential body, while the rubber member 2 acts as an acidic potential body, hence Al ions ($Al^{+++}$) dissolve into the electrolytic solution 3, electrons (e) move from the aluminium alloy member 1 to the rubber member 2 via carbon black serving as a conductive medium, hydrogen ions ($H^+$) in the electrolytic solution 3 accept the electrons (e) at the surface of the rubber member 2, resulting in generation of hydrogen gas ($H_2$), and thus corrosion of the aluminium alloy member proceeds (Cf. Test Example 1). In the event that halogen ions such as chlorine ions dissociated from chlorides are contained in the electrolytic solution, a dissolving rate of Al ions is large and corrosive reaction of the aluminium alloy member 1 is accelerated because an $Al_2O_3$ coating film is not produced on the surface of the aluminium alloy member 1.

Accordingly, it was deduced that in order to prevent rusting of the aluminium alloy member 1 held in contact with the rubber member 2 it would be effective to lower electrical conductivity of the rubber member 2 by reducing a blended amount of carbon black, and correctness of the deduction was confirmed by tests (Cf. Test Example 2). If a surface resistivity of the rubber member 2 is raised up to $10^6 \Omega$ or higher, rusting of the aluminium alloy member 1 can be almost prevented, and if the surface resistivity is raised up to $10^7 \Omega$ or higher, rusting of the aluminium alloy member 1 can be prohibited with respect to every kind of rubber to be combined.

As essential factors influencing corrosion characteristics of the aluminium alloy member 1 held in contact with the rubber member 2, besides the above-mentioned amount of blended carbon black, two factors can be pointed out. The first one is a hydrogen ion exponent (pH) presented as a result of dissolution in the electrolytic solution 3 of chemicals blended in rubber, and the second factor is whether or not a compound of a metallic element having a larger ionization tendency as compared to Al is contained in rubber.

If chemicals blended in rubber dissolve and pH of the electrolytic solution 3 rises, then the electrolytic solution 3 itself makes the corrosion of the aluminium alloy member 1 proceed. For instance, to a certain kind of ethylene-propylene rubber is added CaO as a dehydrating agent, and if this CaO dissolves in the electrolytic solution 3, then pH of the electrolytic solution 3 would rise. $CaCO_3$ blended together with carbon black as a filler also dissolves in the electrolytic solution 3 and causes the pH of the solution 3 to rise. Therefore, whether CaO is blended or $CaCO_3$ is blended it is desirable to make the blended amount small, and although $CaCO_3$ presents a low basicity (small pH) as compared to CaO if their amounts are equal, $CaCO_3$ whose blended amount is large, preferably should not be used (Cf. Test Example 3).

One example of compounds of a metallic element having a larger ionization tendency as compared to Al, which are blended in rubber, is

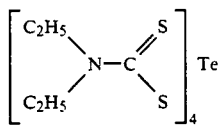

to be used as a vulcanization accelerator. If Te which is a metallic element having a large ionization tendency as compared to Al is present on the surface of the rubber member 2 as illustrated in FIG. 2, then the aluminium alloy member 1 acts as an anode the Te acts as a cathode, and hence Al dissolves in the form of Al ions. From such reasons it is desirable not to use a vulcanization acceleration of metal organic compound group (Cf. Test Example 4).

It is to be noted that without being limited to contact relationship between aluminium alloy and rubber, occurrence of corrosion is observed also in contact relationship between other metals and rubber, and in this case also it is desirable to take a counter-measure similar to that in the case of aluminium alloy. It should be kept in mind that in the metals held in contact with rubber is included a coating film (for example, a plated coating film and a painted film consisting of Zn particles combined by $nCrO_3 \cdot mCr_2O_3$).

The above-described and other objects, features and advantages of the present invention will become more apparent by reference to the following description of preferred embodiments of the invention taken in conjunction with the accompanying drawings.

DESCRIPTION OF THE PREFERRED EMBODIMENTS

Test Example 1

Figure 1:
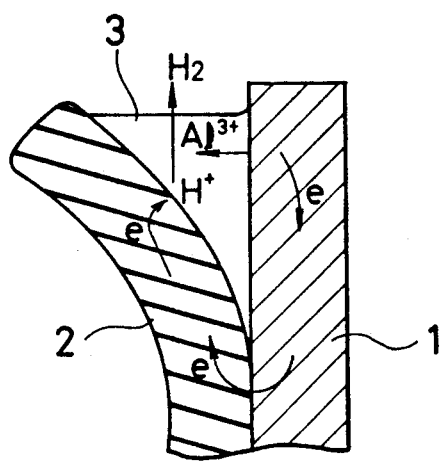
FIGS. 1 and 2 are schematic partial cross-section views illustrating a principle of corrosion of Al in the event that an electrolytic solution is present between Al and rubber members which are held partly in contact with each other.
Figure 2:
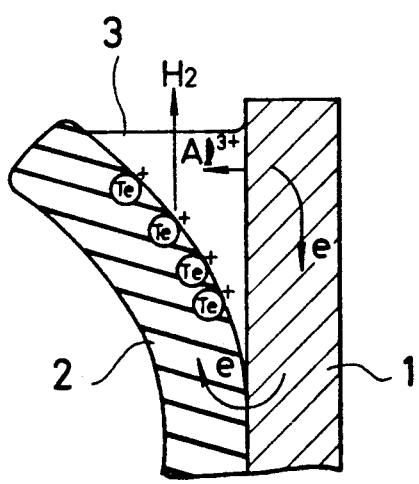
Figure 3:
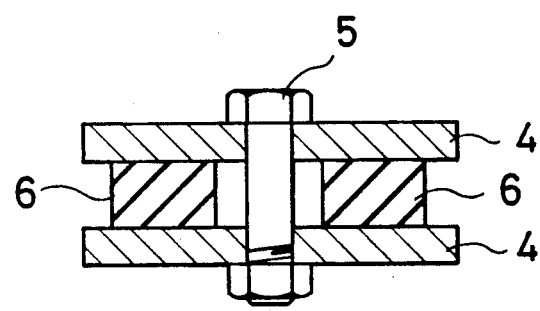
FIG. 3 is a cross-section view of an assembly for use in a salt spray test in which rubber members are sandwiched between two Al plates.

① As shown in FIG. 3, rectangular plates 4, 4 made of Al and a bolt-nut pair 5 were employed, and rubber blocks 6, 6 having a square cross-section were sandwiched between the plates 4, 4.

② Treatments such as spraying of salt water, drying by hot air, leaving it within a wet atmosphere were applied repeatedly to this Al-rubber assembly.

Figure 4:
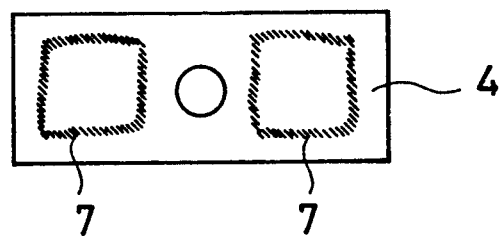
FIG. 4 is a schematic plan view showing a rusting state of the same Al plate after the salt spray test.

③ Thereafter when the Al-rubber assembly was disassembled, white rust 7 was present at the contact portions with the rubber blocks 6, 6 on the surfaces of the plates 4 as shown in FIG. 4. As a result of investigation of this white rust 7 through an X-ray diffraction method, it was known to be a mixture of $NaAlCO_3 \cdot (OH)_2$, $AlO \cdot OH$ and $Al(OH)_3$. It is obvious that this corrosion product is not a product produced by reaction of chemicals blended in rubber with Al.

Test Example 2

① Surface resistivities ($\Omega$) of various kinds of rubber and polyvinyl chloride having different carbon black contents were examined, also they were sandwiched between Al plates 4, 4 as shown in FIG. 3, and corrosion tests similar to those in Test Example 1 were conducted. The results are shown in FIG. 5.

Figure 5:
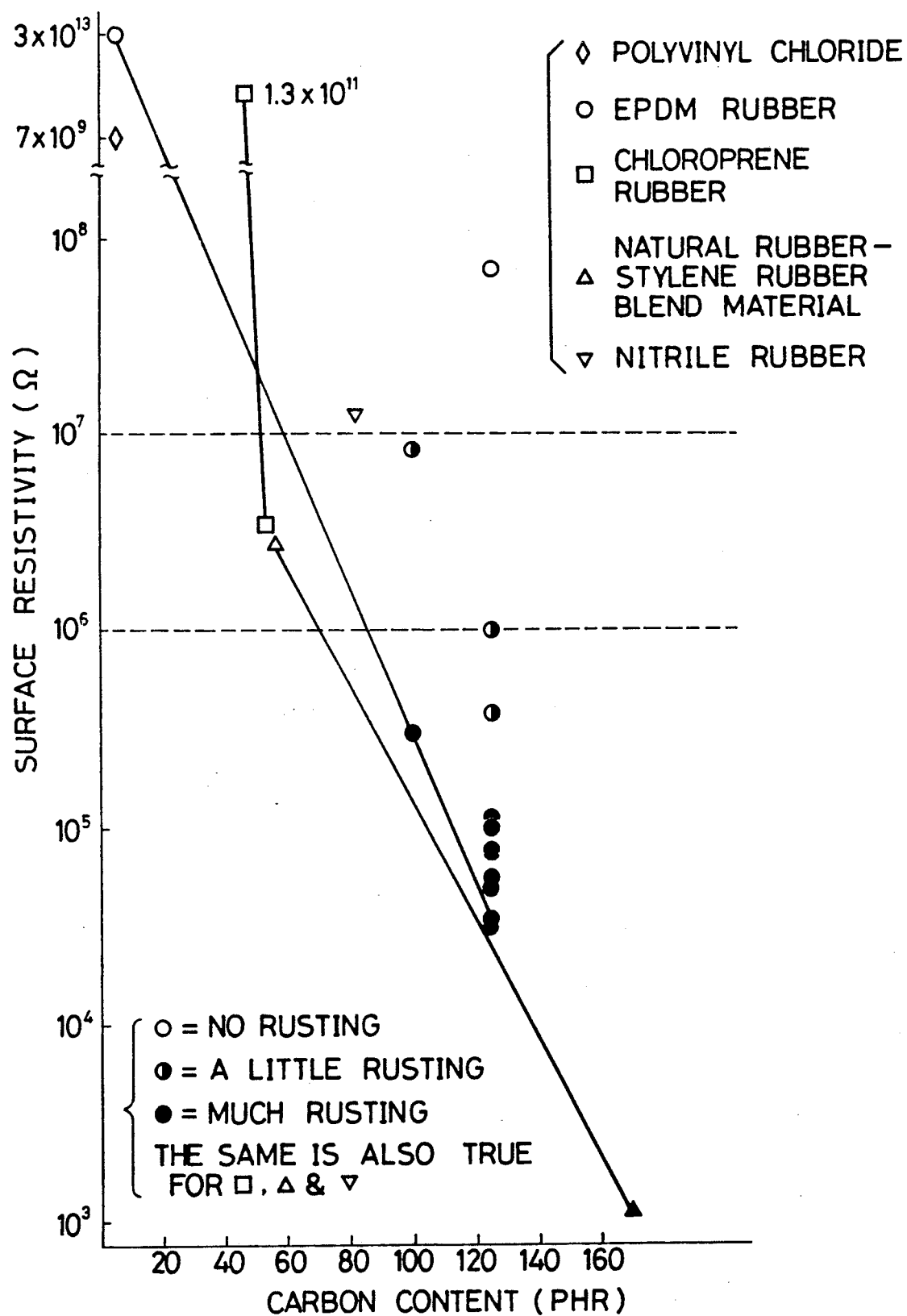
FIG. 5 is a diagram showing surface resistivities ($\Omega$) and results of salt spray tests conducted by making use of an Al-rubber assembly similar to that shown in FIG. 3 with respect to various kinds of rubber having different carbon black contents.

② According to the diagram in FIG. 5, it is seen that if the rubber member is made of rubber having a surface resistivity of $10^6 \Omega$ or higher, its influence upon rusting of Al is little, and that if the surface resistivity is $10^7 \Omega$ or higher, rusting of Al is not present at all. Straight lines in this diagram show variations of a surface resistivity depending upon different contents of added carbon black (same kind, same grain diameter) with respect to same rubber material. With respect to EPDM rubber samples, the reason why a surface resistivity is different even though the carbon black contents are the same, is because of factors other than the content (degree of distribution, grain diameter, kinds of carbon, etc.). In addition, it should be kept in mind that a surface resistivity ($\Omega$) of polyvinyl chloride containing almost no carbon (carbon content: 0.8 PHR) is extremely high ($7 \times 10^9 \Omega$).

Test Example 3

Figure 6:
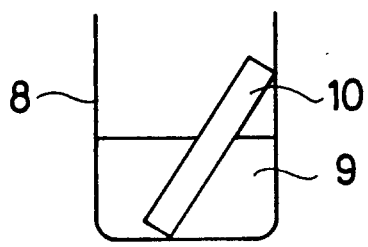
FIG. 6 and 7 are schematic views respectively showing modes of the corrosion tests for Al.

① 2.5 gr of respective chemicals (Table-1) to be blended in rubber were added to distilled water in respective vessels 8 (FIG. 6), after the aqueous solutions 9 were held at a temperature of 50° C. for one hour, pH's of the aqueous solutions 9 were examined. The results are shown in Table-1.

② In the respective aqueous solutions 9, Al rods 10 serving as test pieces were immersed, and after they were held at a temperature of 50° C. for 8 hours, the corroded conditions of the respective Al rods 10 were investigated. The results are shown in Table-1.

③ From Table-1 it is seen that use of such chemicals that dissolve in water and present alkaline nature is unfavorable. Especially, use of $CaCO_3$ which is blended in a large amount as a filler, had better to be avoided.

TABLE 1

| Chemicals | CaO | DM | TE | $CaCO_3$ | Carbon | Sulfur | TT | M | Stearic acid |
|---|---|---|---|---|---|---|---|---|---|
| pH | 12.1 | 10.1 | 8.8 | 7.4 | 7.1 | 6.4 | 6.2 | 4.4 | 4.2 |
| results | X | Δ | Δ | Δ | ○ | ○ | ○ | ○ | ○ |

*Note 1
In the table, DM represents a thiazole group vulcanization accelerator, TE represents a dithioate group vulcanization accelerator, TT represents a tiulum group vulcanization accelerator, and M represents a thiazole group vulcanization accelerator. Constitutional formulae of DM and M are shown in the following:

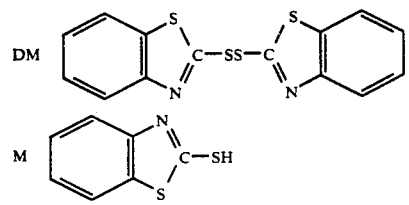

*Note 2
pH of 8.5 or higher and pH of 4.0 or lower are theoretical corrosive regions of Al.
*Note 3
○ = no rusting, Δ = a little rusting, X = much rusting.

Test Example 4

Figure 7:
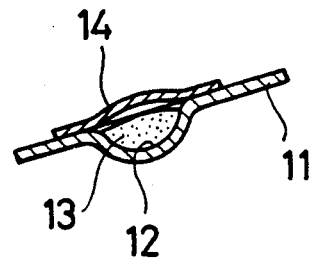

① Effects of the respective chemicals (Table-2) to be blended in rubber affected upon Al under existence of an electrolytic solution were investigated. In FIG. 7 is shown a mode of the test. In this figure, reference numeral 11 designates an Al plate, a chemical 13 was put in a recess 12 of the Al plate 11, a permeable membrane 14 was stuck to the Al plate 11 so as to cover the recess 12, the entire assembly was set in a salt-spray-testing machine under an inclined condition as shown in FIG. 7, and thus a corrosion test for the Al plate 11 was conducted. The test results are shown in Table-2.

② From Table-2, the followings are seen:
(a) Existence of carbon black accelerates rusting of Al (due to the fact that carbon black acts as a conductive medium and promotes dissolution of Al ions).
(b) Existence of metal organic compound group vulcanization accelerator accelerates rusting of Al (because Al has a basic potential as compared to the metal in the vulcanization accelerator).
(c) Existence of CaO serving as a dehydrating agent accelerates rusting of Al (because it makes the electrolytic solution alkaline).
(d) $CaCO_3$ used as a bulking agent does not contribute so much to rusting of Al. However, since $CaCO_3$ is used normally 7-8 times as much as CaO, the influence thereof is considered to be large (since it makes the electrolytic solution alkaline).

TABLE 2

| Chemicals | | | Results |
|---|---|---|---|
| vulcanization assistant | | ZnO | Δ |
| | | stearic acid | ○ |
| | | polyethylene glycol | ○ |
| carbon | | carbon black | X |
| bulking agent | | $CaCO_3$ | Δ |
| softener | | paraffin oil | ○ |
| vulcanization accelerator | organic compound group | thiazole group (DM) | ○ |
| | | thiazole group (M) | ○ |
| | | tiulum group (TT) | ○ |
| | | tiulum group (TRA) | ○ |
| | | thiourea group | ○ |
| | metal organic compound group | dithioate group | X |
| vulcanizing agent | | sulfur | ○ |
| dehydrating agent | | CaO | X |

*Note ... ○ = no rusting, Δ = a little rusting, X = much rusting.

Test Example 5

Figure 8:
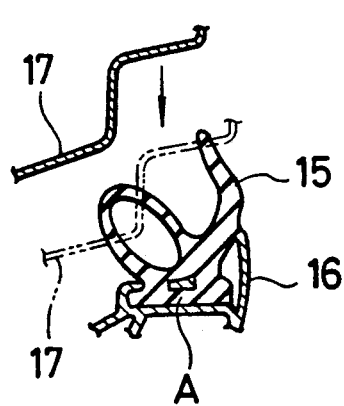
FIG. 8 is a cross-section view showing a combination (a door made of aluminium alloy and a weather strip made of EPDM rubber in a motorcar) according to one preferred embodiment of the present invention.
Figure 9:
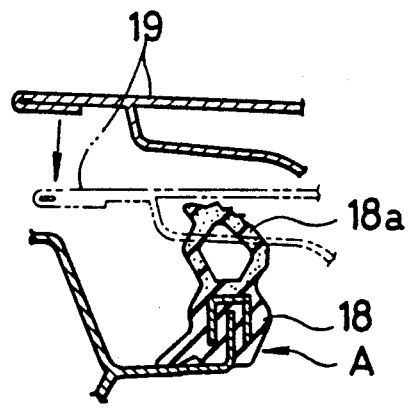
FIG. 9 is a cross-section view showing a combination (a trunk lid made of aluminium alloy and a weather strip made of EPDM rubber in a motorcar) according to another preferred embodiment of the present invention.

FIGS. 8 and 9, respectively, show a weather strip 15 for a door and a weather strip 18 for a trunk lid.

The weather strip 15 is made of EPDM rubber (EPDM is terpolymer containing diene compounds as a third component), and it is fixedly secured to a vehicle body side member 16 at a portion A containing a core metal. In the EPDM rubber forming the weather strip 15, is used a clay group bulking agent ($CaCO_3$ not used), and an organic compound group vulcanization accelerator such as thiazole group or thiourea group is used. Its surface resistivity is $5 \times 10^8 \Omega$. When a salt spray test similar to Test Example 1 was conducted under the condition where a door plate 17 made of aluminium alloy was closed and brought into contact with the weather strip 15, rusting of the door plate 17 was not observed.

The weather strip 18 is made of EPDM rubber, it is fixedly secured to a vehicle body side member 20 at a portion A containing a core metal, and a tip end side half portion 18a coming into contact with a trunk lid 19 made of aluminium alloy is formed as a foamed body. In the EPDM rubber forming the weather strip 18 is used a silica group or a clay group bulking agent ($CaCO_3$ not used), and an organic compound group vulcanization accelerator such as thiazole group or thiourea group is used. Its surface resistivity is $6 \times 10^8 \Omega$. When a salt spray test similar to Test Example 1 was conducted under the condition where a trunk lid 19 made of aluminium alloy was closed and brought into contact with the weather strip 18, rusting of the trunk lid 19 was not observed.

As will be obvious from the above description, according to the present invention, since a surface resistivity of a rubber member to be used in contact with an aluminium alloy member is chosen to be $10^6 \Omega$ or higher, electrical conductivity between the aluminium alloy member and the rubber member under existence of a electrolytic solution is sufficiently low accordingly an electric cell between aluminium alloy and rubber due to a potential difference would be hardly formed, and hence, rusting of the aluminium alloy can be suppressed.

While a principle of the present invention has been described above in connection to preferred embodiments of the invention, it is intended that all matter contained in the specification and illustrated in the accompanying drawings shall be interpreted to be illustrative and not in a limiting sense.

What is claimed is:

1. A weather strip for insertion between the body of a vehicle and an aluminum-alloy door or trunk lid for the vehicle consisting essentially of a layer of rubber containing carbon black and having a resistivity of $10^7 \Omega$ or higher.

2. A weather strip according to claim 1, wherein the rubber is an ethylene-propylene rubber.

3. A seal member for sealing between an aluminum-alloy member in a vehicle and another member in a vehicle consisting essentially of a layer of rubber containing carbon black and having a resistivity of $10^7 \Omega$ or higher.

4. A seal member attached to an aluminum-alloy member of a vehicle for preventing intrusion of water consisting essentially of a layer of rubber containing carbon black and having a resistivity of $10^7 \Omega$ or higher.

* * * * *